United States Patent
Runge (10) Patent No.: US 9,521,374 B1
(45) Date of Patent: Dec. 13, 2016

(54) REAL TIME RELATIVE PERFORMANCE INDICATION FOR REDUNDANT AVIONICS OPTICAL DATA TRANSMISSION SYSTEMS FOR AERIAL REFUELING REMOTE VISION SYSTEMS

(71) Applicant: ROCKWELL COLLINS, INC., Cedar Rapids, IA (US)

(72) Inventor: Aaron L. Runge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 687 days.

(21) Appl. No.: 13/929,928

(22) Filed: Jun. 28, 2013

(51) Int. Cl.
  *H04N 7/18* (2006.01)
(52) U.S. Cl.
  CPC .................................... *H04N 7/181* (2013.01)
(58) Field of Classification Search
  CPC ............................ G01F 23/0069; H04N 7/181
  See application file for complete search history.

(56) References Cited

U.S. PATENT DOCUMENTS

| | | | |
|---|---|---|---|
| 6,356,809 B1* | 3/2002 | Morrison | G01F 23/0069 700/22 |
| 8,130,773 B2* | 3/2012 | Hall | H04L 12/42 370/216 |
| 2004/0052450 A1* | 3/2004 | Morrison | G01F 23/0069 385/24 |
| 2008/0246957 A1* | 10/2008 | Beranek | G02B 6/4203 356/73.1 |
| 2008/0260379 A1* | 10/2008 | Beranek | G01M 11/37 398/21 |

\* cited by examiner

*Primary Examiner* — Tung Vo
*Assistant Examiner* — Rowina Cattungal
(74) *Attorney, Agent, or Firm* — Donna P. Suchy; Daniel M. Barbieri (57) ABSTRACT

The present disclosure describes a system for notification, during flight and on ground, of the relative quality between two redundant optical data distribution networks on an aircraft, which are used for remote surveillance of refueling activities where there is no need to disconnect a fiber optic connection to make the quality assessment.

20 Claims, 5 Drawing Sheets

REAL TIME RELATIVE PERFORMANCE INDICATION FOR REDUNDANT AVIONICS OPTICAL DATA TRANSMISSION SYSTEMS FOR AERIAL REFUELING REMOTE VISION SYSTEMS

BACKGROUND

Many newer aircraft make extensive use of optical fibers for data transmission because of EMI benefits, to reduce weight, increase data throughput, and provide other benefits. Such optical data transmission systems are increasingly being used for safety critical, on-board video surveillance systems, such as used in conjunction with in-flight refueling systems. These systems are not immune to failures and performance issues. In the past, it has been known that optical connections can get dirty, especially in dry dusty desert environments, and it has been known to deploy a technician to test such systems by disconnecting the various LRUs and checking the optical path, component by component, and link by link. This is done when the aircraft is on the ground, such as during down time; e.g. when undergoing routine maintenance or urgent repairs.

While this system has been employed widely in the past, it has some drawbacks. Such testing requires a skilled technician and consumes, or possibly extends, the valuable time when the aircraft is on the ground and not in service. Often such testing, or alternatively prophylactic maintenance, must be done more frequently when operating in certain environments, especially when in-flight failures may be catastrophic.

Consequently, there exists a need for improved systems and methods for monitoring and maintaining the integrity of optical data transmission systems on an aircraft.

SUMMARY OF THE INVENTION

It is an object of the present invention to increase integrity of on-board optical data distribution systems.

It is a feature of the present invention to include on-board the aircraft a plurality of digital diagnostics monitoring optoelectronic interfaces, each coupled to either an LRU, a central computer or a display device. Throughout this document, an LRU is being considered as any functional electronic device in or around the aircraft.

It is an advantage of the present invention to provide for the ability to monitor, in-flight and in real time, live diagnostic data with respect to said digital diagnostics monitoring optoelectronic interfaces.

It is another feature of the present invention to include an optical network status comparison ability for redundant optoelectronic systems on an aircraft.

It is still another feature of the present invention to include an ability to display, in real time, live quantized optical link performance information for optical paths on an aircraft, in-flight as well as on the ground.

It is an advantage of the present invention to provide for an ability to increase the efficiency of optoelectronic data transmission systems on airborne aircraft.

The present invention is a system and method for increasing effectiveness of optoelectronic data transmission on board an airborne aircraft, which is designed to achieve the above described object, include the aforementioned features and provide the previously stated advantages.

The present invention includes a system and method of transmitting optical data comprising the steps of:

A method of determining a superior performing optical data distribution network for in-flight video surveillance information among a plurality of redundant refueling surveillance system optical data distribution networks, the method comprising the steps of:

providing a first redundant video surveillance system performance assessment comprising the steps of:

providing a first camera which outputs first electrical video signals;

providing a first camera fiber optic transceiver for converting said first video signals from a first electrical video signal to a first optical video signal;

monitoring said first camera fiber optic transceiver for first camera diagnostic data comprising at least three of:

temperature of said first camera fiber optic transceiver, supply voltage of said first camera fiber optic transceiver, transmitter bias current of said first camera fiber optic transceiver, optical transmit power of first camera fiber optic transceiver, optical receive power of first camera fiber optic transceiver; and optical time domain reflection measurements;

providing a first computer which processes first electrical digital data;

providing a first computer fiber optic transceiver for converting said first electrical digital computer data to first optical digital computer data;

monitoring said first computer fiber optic transceiver for first computer diagnostic data comprising at least three of:

temperature of said first computer fiber optic transceiver, supply voltage of said first computer fiber optic transceiver, transmitter bias current of said first computer fiber optic transceiver, optical transmit power of first computer fiber optic transceiver, optical receive power of first computer fiber optic transceiver; and optical time domain reflection measurements;

providing a first display device for displaying an image representative of said first electrical video signals;

providing a first fiber optic link between said first camera, said first display device and said first computer which carries said first optical video signals and signals representative of said first camera diagnostic data;

without disconnecting a fiber optic connection, making a quantitative assessment of performance based upon an optical link budget based upon performance of said first camera fiber optic transceiver, and said first computer fiber optic transceiver and said first fiber optic link;

providing a second redundant video surveillance system performance assessment comprising the steps of:

providing a second camera which outputs second electrical video signals;

providing a second camera fiber optic transceiver for converting said second video signals from a second electrical video signal to a second optical video signal;

monitoring said second camera fiber optic transceiver for second camera diagnostic data comprising at least three of:

temperature of said second camera fiber optic transceiver, supply voltage of said second camera fiber optic transceiver, transmitter bias current of said second camera fiber optic transceiver, optical transmit power of second camera fiber optic transceiver, and optical receive power of second camera fiber optic transceiver;

providing a second computer which processes second electrical digital data;

providing a second computer fiber optic transceiver for converting said second electrical digital computer data to second optical digital computer data;

monitoring said second computer fiber optic transceiver for second computer diagnostic data comprising at least three of:

temperature of said second computer fiber optic transceiver, supply voltage of said second computer fiber optic transceiver, transmitter bias current of said second computer fiber optic transceiver, optical transmit power of second computer fiber optic transceiver, and optical receive power of second computer fiber optic transceiver;

providing a second display device for displaying an image representative of said second electrical video signals;

providing a second fiber optic link between said second camera, said second display device and said second computer, which carries said second optical video signals and signals representative of said second camera diagnostic data;

without disconnecting a fiber optic connection, making a second quantitative assessment of performance based upon an optical link budget based upon performance of said second camera fiber optic transceiver, and said second computer fiber optic transceiver and said second fiber optic link;

comparing said first quantitative assessment of performance and said second quantitative assessment of performance while said first fiber optic link is on a refueling tanker which is airborne; and providing to a person onboard said refueling tanker with a live indicator of superior performance between said first redundant video surveillance system and said second redundant video surveillance system.

DETAILED DESCRIPTION

Figure 1:
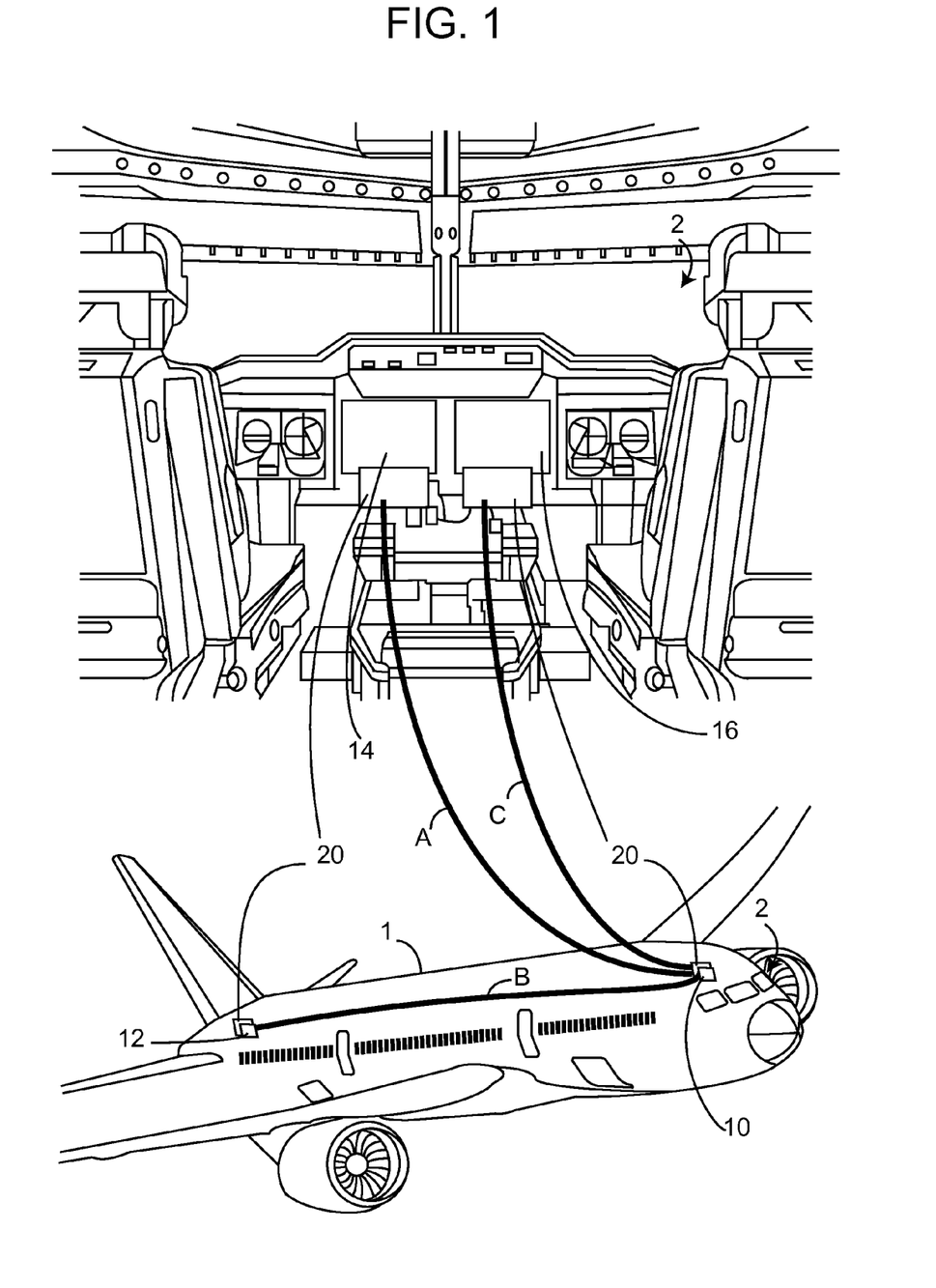
FIG. 1 shows an aircraft, with an inset of a cockpit and a simplified optical network.

Now referring to FIG. 1, there is shown a cartoon drawing of an avionics system with an optical data network. The system could be any type of avionics system such as, but not limited to, a video surveillance system for use in refueling aircraft. Such a system, and other systems, may comprise of a central computer 10, which can be any type of computer, router, hub or any other electronic device which is coupled to more than one other device via fiber optic cable. In this example, it is a central control computer for an aircraft. Coupled to central computer 10 is a digital diagnostics monitoring optoelectronic interface 20, which can be a somewhat standardized device, which converts electronic signal to optical signal, and vice versa, then communicating with other LRUs through a fiber optic link, such a links A, B and C, which are well known in the art but may preferably be multi-mode optical fibers and may be uni-directional or bi-directional optical fibers. Also shown is a LRU 12, which could be located remotely in the aircraft, such as, but not limited to, a video camera, a GPS receiver, an accelerometer or any other device located in or around the aircraft 1, which has a digital diagnostics monitoring optoelectronic interface 20 attached thereto for converting from optical to electronic, and vice versa, digital optical signals received from or sent over the optical network. Also shown on aircraft 1 is an inset view of a cockpit 2 of the aircraft 1, which shows, among other things, a first platform display device 14 and a second platform display device 16, each of which is shown with a digital diagnostics monitoring optoelectronic interface 20 coupled thereto. FIG. 1 could have been drawn without the inset and with very short lines A and C running to boxes 14 and 16, each with a box 20, all located in the cockpit area of the aircraft.

If the aircraft 1 is a refueling tanker, then LRU 12 may be a video surveillance system, or a portion thereof, such as a video camera assembly. In a typical refueling tanker, there are redundant video surveillance systems and stations, so in such an application there could be another LRU, which is substantially the same as LRU 12. The optical network of FIG. 1 is simplified and is shown as a representative simple airborne avionics optical data transmission network. More elaborate networks are envisioned and are believed to be enabled by this simplified example.

Figure 2:
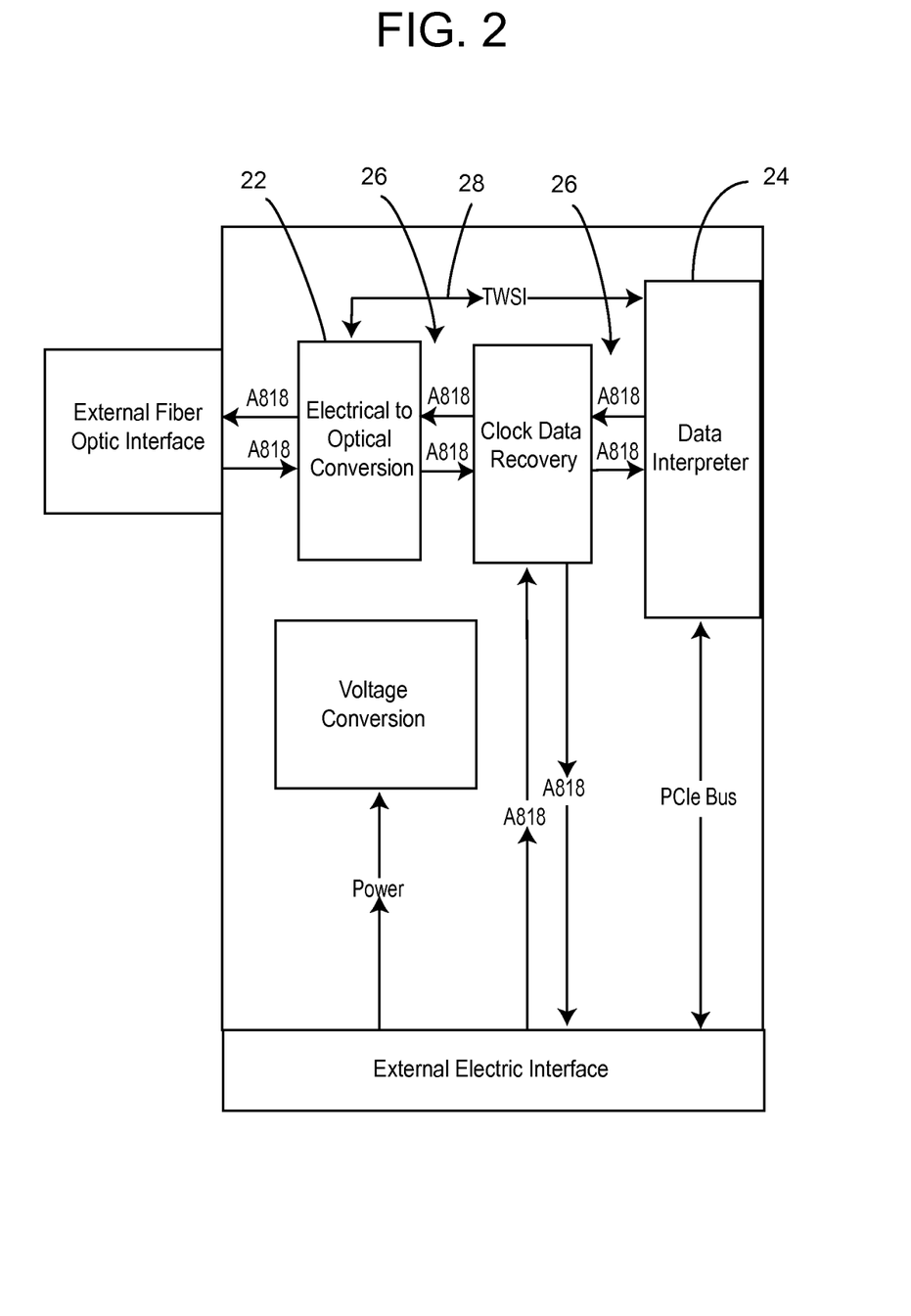
FIG. 2 shows a digital diagnostics monitoring optoelectronic interface of the present invention.

Now referring to FIG. 2, there is shown a more detailed view of the novel digital diagnostics monitoring optoelectronic interface 20 of FIG. 1, which includes a fiber optic transceiver 22, which can be a single device for both transmitting and receiving data, and converting the data from electrical data to optical data, or vice versa. It may also be a dedicated receiver or dedicated transmitter, or any combination of multiple transmitters mixed with multiple receivers, which will herein be referenced as only fiber optic transceivers. One example of a fiber optic transceiver that is commercially available is the RJ-3G-SXHP-D-DPLX-LC-R-A device available from the COTSWORKS company located in Highland Heights, Ohio. A dedicated fiber optic receiver 22 would receive optical data via an optical link, such a links A, B and C, and convert the data to electrical data, provide that electrical data to a data interpreter 24 module via an electronic data line 26, which may be an electronic high speed serial data bus. High speed electronic data line 26 is shown with a Clock Data Recovery block disposed therein for providing necessary signal conditioning. The A818 signal may be a 3.1875 Gbps ARINC 818 signal, but may be any electrical data bus. The data interpreter 24 could be performed by various types of hardware, including, but not limited to, a field programmable gate array (FPGA) such as the EP2AGX45DF25I5 Arria II device from Altera. The fiber optic transmitters 22 receive high speed electronic data from the data interpreter 24 via the high speed electronic data line 26 and convert it to optical data to be transmitted on the fiber optic links.

Disposed between data interpreter 24 and fiber optic transceivers 22 is also a digital diagnostic data line 28, which may be a Two Wire Serial Interface (TWSI), which is a 100 Khz bus with a clock line and a data line. The TWSI is the interface used by the data interpreter 24 to gather the diagnostics data from the one or more fiber optic transceivers 22 that may be connected to data interpreter 24. This diagnostic data may include temperature, supply voltage, transmit bias current, optical transmit power, optical receive power, as well as other faults, flags and monitoring information.

The data interpreter 24:
- receives high speed electrical data from the fiber optic transceivers 22;
- transmits high speed electrical data to the fiber optic transceivers 22;
- continuously gathers diagnostics data from the fiber optic transceivers 22;
- continuously gathers data from the external electrical interface, which may be a 5 Gbps Gen 2 PCIe bus;
- responds to commands from the external electrical interface to read specific information;
- sends out requested data on the external electrical interface;
- responds to commands from the external optical interface to read specific information;
- sends out requested data to the high speed electrical interface with the fiber optic transmitter, where it is converted from electrical to optical and sent onto the external optical interface.

Figure 5:
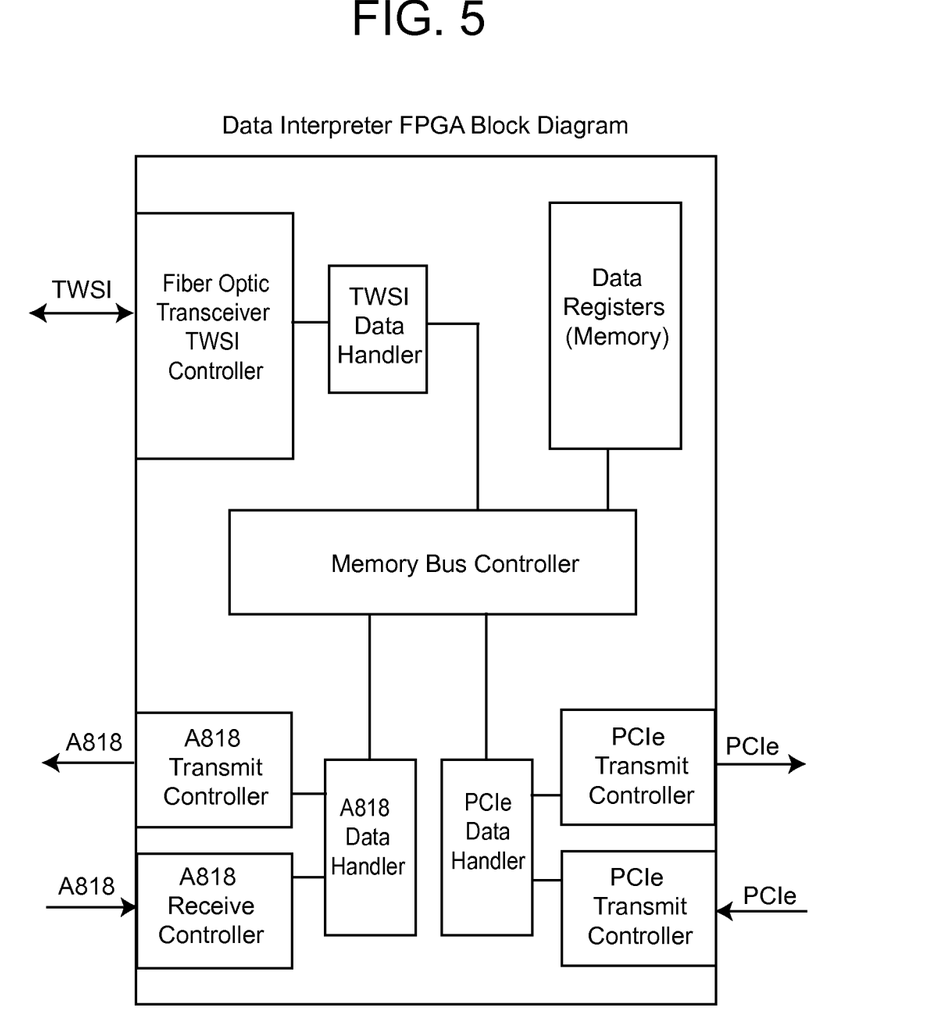
FIG. 5 is a block diagram view of the internal portions of the data interpreter of FIG. 2.

The data interpreter 24 can gather data from the optically received data, digital diagnostics data, and external electrical interface. It puts that data into internal memory for current or future manipulation, and can send that data out either via the external optical interface or the external electrical interface. The data interpreter 24 may provide data to, and receive data requests from, central computer 10 or other sources. These data requests may be intermittent or may, in some applications, be periodic, e.g. per cycle or every second etc. A more thorough understanding of the data interpreter 24 can be achieved by referring to FIG. 5, which shows some of the internal structures and organization.

Figure 3:
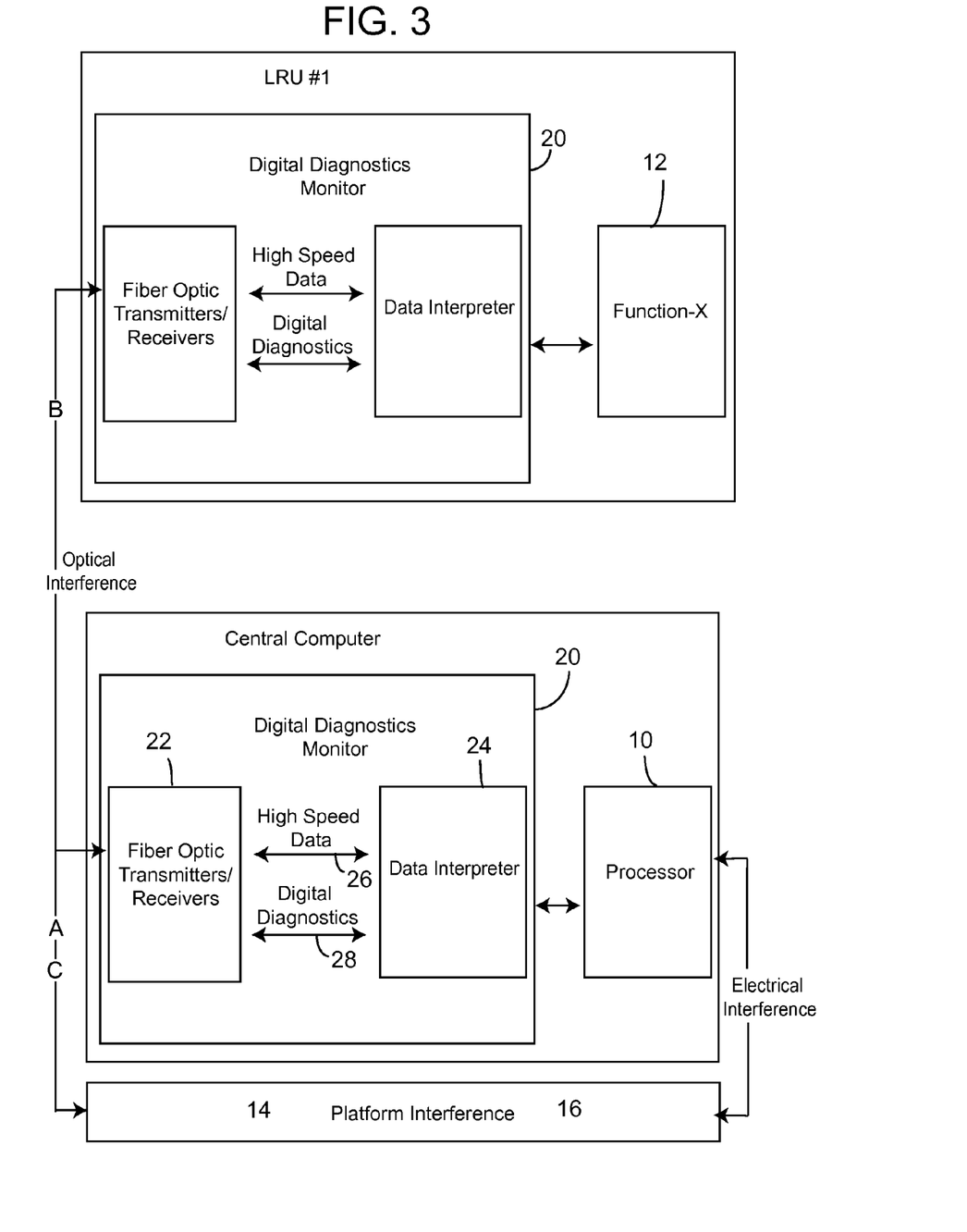
FIG. 3 shows a more detailed view of a portion of the optical network of FIG. 1, including digital diagnostics monitoring opto-electronic interfaces of FIG. 2.

Now referring to FIG. 3, there is shown an alternate embodiment of the simplified network of the present invention, which includes an LRU#1, which includes integrated therein (inside the LRU), a digital diagnostics monitoring optoelectronic interface 20 and some other functionality, such as is shown in FIG. 1 as LRU 12. The main difference between LRU 12 and digital diagnostics monitoring optoelectronic interface 20 in FIG. 1 is that digital diagnostics monitoring optoelectronic interface 20 is shown in FIG. 1 as an add-on device; but in FIG. 3, LRU 12 and digital diagnostics monitoring optoelectronic interface 20 are combined into a single LRU#1. Similarly, the central computer 10 and digital diagnostics monitoring optoelectronic interface 20 of FIG. 1 are integrated in FIG. 3 into a single central computer, which itself may be a LRU. The remainder of the system of FIG. 1 is also shown, including platform display device 14 and platform display device 16, and optical links A, B and C. Also there is shown an electrical interface which couples the central computer 10 with the platform display device 14 and platform display device 16, that may be used as an alternative way to get the fiber link information to the platform.

Figure 4:
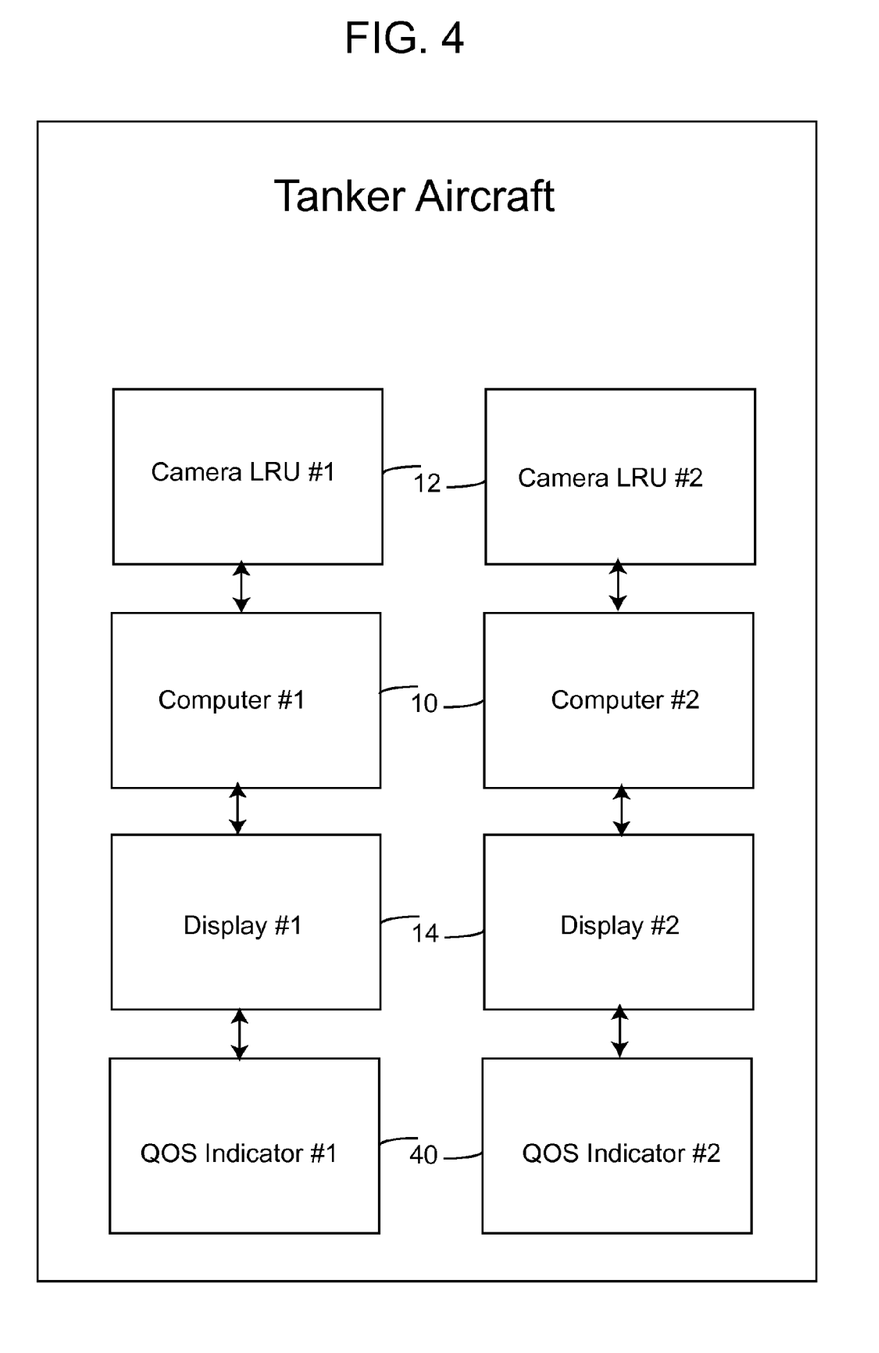
FIG. 4 shows a simplified version of redundant video surveillance systems on a refueling tanker.

In operation and now referring to FIG. 4, there is shown a system of the present invention which could be adapted and employed on a KC-46 Tanker as follows:

There are two parallel and redundant systems for refueling aircraft on board the tanker. Each of the redundant systems has a central computer 10, which is configured to communicate with a camera LRU 12 through its optical interface. The digital diagnostics data, as well as the video from LRU#1, is transmitted to the central computer 10 through its fiber optic interface. The data interpreter 24 of the central computer then gathers the digital diagnostics data from the LRU #1, as well as its own digital diagnostics information. All of this information is then presented to the central computer's processor. When the system monitors the optical power transmitted at one point in the optical data path, and then measures the power that same data is received at a remote location, the processor then has the capability to logically break the optical network into a series of point-to-point transmissions and examine and quantitatively assess all of the fiber optic links between any two optically coupled LRUs on the aircraft, including the two shown LRUs (central computer LRU and camera LRU#1) and present that information to the platform display devices 14 and 16, where it is accessible by the user. This information can be delivered to the platform interface either optically or electrically. However, it may be preferred that the platform interface also have digital diagnostics monitoring optoelectronic interface 20, then the central computer could generate a budget of all of the losses in the links between the camera, the central computer and platform interface as well.

Since there are two redundant systems for video surveillance of the remote fueling tanker, these link budgets can be easily compared between the two redundant systems to determine which has the highest performance and therefore is the more reliable of the two. A visual indicator, or light 40, could be located at each of the redundant refueling stations, and be illuminated with a color of light, such as green, for acceptable and the best of the two redundant systems, yellow for acceptable and the lesser of the two redundant systems, or red meaning the link budget is below the acceptable threshold. Other visual indicators (such as icons in a GUI or any other visual representation) could be used for easy display of the relative quality of the optical network during in-flight operation, and immediately in advance of selecting one of the redundant systems for refueling an aircraft.

The system of the present invention is easily scalable from the simplified systems shown by adding as many LRUs as required for the platform. LRUs 1, 2, 3, 4, etc. could all be connected to one or more central computers. The central computer could then figure all of the optical link budgets in the airplane and present that information to the platform interface. The central computer can be any device capable of gathering the information from the data interpreter and then presenting that information to the platform interface.

One especially valuable aspect of the present invention is the ability to do end of life (EOL) monitoring and prediction for fiber optic transceivers 22 and components thereof. Depending upon the transceivers chosen for any particular application, EOL performance data can be input from a manufacture, or stored onboard during the life of the fiber optic transceivers 22. Typically, before failure of a fiber optic transceivers 22, there are changes in the performance ratios, e.g. optical power output as a function of drive current or voltage. When such ratios exceed predetermined limits, EOL warnings can be issued, or otherwise utilized in internal maintenance prescriptions, to be issued by the controlling computer. Reducing the number of times that fiber optic transceivers 22 fail during flight can be a very valuable aspect of the present invention.

What is claimed is:

1. A method of determining a superior performing optical data distribution network for in-flight video surveillance information among a plurality of redundant refueling surveillance system optical data distribution networks, the method comprising the steps of:
providing a first redundant video surveillance system performance assessment comprising the steps of:
providing a first camera which outputs first electrical video signals;
providing a first camera fiber optic transceiver for converting said first video signals from a first electrical video signal to a first optical video signal;
monitoring said first camera fiber optic transceiver for first camera diagnostic data comprising at least three of:
temperature of said first camera fiber optic transceiver,
supply voltage of said first camera fiber optic transceiver,
transmitter bias current of said first camera fiber optic transceiver,
optical transmit power of said first camera fiber optic transceiver, optical receive power of said first camera fiber optic transceiver; and
optical time domain reflection measurements;
providing a first computer which processes first electrical digital data;
providing a first computer fiber optic transceiver for converting said first electrical digital computer data to first optical digital computer data;
monitoring said first computer fiber optic transceiver for first computer diagnostic data comprising at least three of:
temperature of said first computer fiber optic transceiver,
supply voltage of said first computer fiber optic transceiver,
transmitter bias current of said first computer fiber optic transceiver,
optical transmit power of said first computer fiber optic transceiver,
optical receive power of said first computer fiber optic transceiver; and
optical time domain reflection measurements;
providing a first display device for displaying an image representative of said first electrical video signals;
providing a first fiber optic link between said first camera, said first display device and said first computer which carries said first optical video signals and signals representative of said first camera diagnostic data;
while maintaining a fiber optic connection, making a quantitative assessment of performance based upon an optical link budget based upon performance of said first camera fiber optic transceiver, and said first computer fiber optic transceiver and said first fiber optic link, said performance including the optical transmit power or optical receive power of the first camera fiber optic transceiver;
providing a second redundant video surveillance system performance assessment comprising the steps of:
providing a second camera which outputs second electrical video signals;
providing a second camera fiber optic transceiver for converting said second video signals from a second electrical video signal to a second optical video signal;
monitoring said second camera fiber optic transceiver for second camera diagnostic data comprising at least three of:
temperature of said second camera fiber optic transceiver,
supply voltage of said second camera fiber optic transceiver,
transmitter bias current of said second camera fiber optic transceiver,
optical transmit power of second camera fiber optic transceiver, and
optical receive power of second camera fiber optic transceiver;
providing a second computer which processes second electrical digital data;
providing a second computer fiber optic transceiver for converting said second electrical digital computer data to second optical digital computer data;
monitoring said second computer fiber optic transceiver for second computer diagnostic data comprising at least three of:
temperature of said second computer fiber optic transceiver,
supply voltage of said second computer fiber optic transceiver,
transmitter bias current of said second computer fiber optic transceiver,
optical transmit power of said second computer fiber optic transceiver, and
optical receive power of said second computer fiber optic transceiver;
providing a second display device for displaying an image representative of said second electrical video signals;
providing a second fiber optic link between said second camera, said second display device and said second computer, which carries said second optical video signals and signals representative of said second camera diagnostic data;
while maintaining a fiber optic connection, making a second quantitative assessment of performance based upon an optical link budget based upon performance of said second camera fiber optic transceiver, and said second computer fiber optic transceiver and said second fiber optic link;
comparing said first quantitative assessment of performance and said second quantitative assessment of performance while said first fiber optic link is on a refueling tanker which is airborne; and
providing to a person onboard said refueling tanker with a live indicator of superior performance between said first redundant video surveillance system and said second redundant video surveillance system.

2. The method of claim 1 wherein the step of providing to a person onboard said refueling tanker with a live indicator further comprises providing a visual indicator light associated with each of two redundant refueling stations.

3. A self analyzing airborne optical data distribution network which is configured to provide a live indication of a quality of connection wherein said live indication occurs during flight of an aircraft carrying said airborne optical data distribution network the network comprising:
a first avionics line replaceable unit (LRU), which is configured with a first optical transceiver to transmit and/or receive optical data;
a second avionics LRU which is configured with a second optical transceiver to transmit and/or receive optical data;

an optical data link disposed on an aircraft and further disposed between said first avionics LRU and said second avionics LRU;

wherein at least one of said first avionics LRU and said second avionics LRU, individually or in combination, comprises a means to assess a quality of an optical path from said first avionics LRU, through said optical data link to said second avionics LRU, while maintaining an optical connection, said quality of an optical path including an optical transmit power of said first optical link.

4. The network of claim 3 wherein said means to assess further comprises a first data interpreter, where said first data interpreter monitors diagnostic data including a plurality of:
temperature of said first optical transceiver,
supply voltage of said first optical transceiver,
transmitter bias current of said first optical transceiver, and
optical transmit power of said first optical transceiver.

5. The network of claim 4 wherein said means to assess further monitors an optical receive power of said second optical transceiver.

6. The network of claim 5 further comprising a third avionics LRU, a fourth avionics LRU, a fifth avionics LRU and a sixth avionics LRU; each of which is configured to output/receive optical data onto a collection of coupled optical fibers; wherein said means to assess is further configured to analyze each optical path extending between any two of said first avionics LRU, said second avionics LRU, said third avionics LRU, said fourth avionic LRU; said fifth avionics LRU and said sixth avionics LRU, so as to determine a quality of service characteristic of said optical path.

7. The network of claim 4 wherein said means to assess further comprises a second data interpreter, where said second data interpreter monitors diagnostic data including optical receive power of an optical transceiver.

8. The network of claim 3 wherein said means to assess monitors an optical receive power of said second optical transceiver.

9. The network of claim 3 wherein diagnostic data of said first optical transceiver is exclusively shared with said second avionics LRU via said optical data link.

10. The network of claim 3 wherein said means to assess further comprises a data interpreter, where said data interpreter monitors diagnostic data including a plurality of:
temperature of an optical transceiver,
supply voltage of an optical transceiver,
transmitter bias current of an optical transceiver,
optical transmit power of an optical transceiver; and
optical receive power of an optical transceiver.

11. A system for real time in-flight in mission or on ground indicating a quality of service of an optical data distribution network for airborne redundant refueling systems comprising:
a first avionics device comprising:
a first fiber optic transceiver;
a first data interpreter;
a first high speed electronic data line coupled between the first fiber optic transceiver and the first data interpreter;
a first avionics module coupled to said first data interpreter;

a second avionics device comprising:
a second fiber optic transceiver;
a second data interpreter;
a second high speed electronic data line coupled between the second fiber optic transceiver and the second data interpreter;
a second avionics module coupled to said second data interpreter;
a fiber optic data link coupling said first avionics device and said second avionics device;
wherein said first data interpreter monitors diagnostic data including a plurality of:
temperature of first fiber optic transceiver,
supply voltage of first fiber optic transceiver,
transmitter bias current of first fiber optic transceiver, and
optical transmit power of first fiber optic transceiver,
wherein diagnostic data from and pertaining to the performance of said first fiber optic transceiver is transmitted to said second avionics device;
an indicator configured to generate, in real time and during flight, without a need to disconnect any fiber optic connection, a notification of a level of optical performance of said fiber optic data link, said first fiber optic transceiver and said second fiber optic transceiver, said optical performance including the optical transmit power of said first fiber optic transceiver.

12. The system of claim 11 further comprising:
a first box;
a second box;
wherein said first fiber optic transceiver, said first data interpreter, said first high speed electronic data line, said first digital diagnostic data line, and said first avionics module are all disposed within said first box; and
wherein said second fiber optic transceiver, said second data interpreter, said second high speed electronic data line, said second digital diagnostic data line, and said second avionics module are all disposed within said second box.

13. The system of claim 12 wherein said first box is an avionics line replaceable unit (LRU) and said second box is an avionics LRU.

14. The system of claim 11 wherein said first data interpreter comprises a first field programmable gate array (FPGA).

15. The system of claim 14 wherein said second data interpreter comprises a second FPGA.

16. The system of claim 11 further comprising a first digital diagnostic data line coupled between the first fiber optic transceiver and the first data interpreter and a second digital diagnostic data line coupled between the second fiber optic transceiver and the second data interpreter.

17. The system of claim 11 wherein said indicator is a visual indicator.

18. The system of claim 11 wherein said first fiber optic transceiver comprises a laser transmitter.

19. The system of claim 11 wherein said first avionics device and said second avionics device are coupled together exclusively by said fiber optic data link.

20. The system of claim 11 wherein said wherein said second data interpreter monitors diagnostic data optical receive power of said second fiber optic transceiver.

* * * * *